United States Patent [19]

Peterson et al.

[11] 4,402,119
[45] Sep. 6, 1983

[54] FILTER BAG HOOKS

[75] Inventors: Harley G. Peterson, LaCrescenta; Reginald Sidaway, LaCanada, both of Calif.

[73] Assignee: Joy Manufacturing Company, Pittsburgh, Pa.

[21] Appl. No.: 296,944

[22] Filed: Aug. 28, 1981

[51] Int. Cl.³ .............................................. A44B 13/00
[52] U.S. Cl. ................................ 24/370; 24/201 HH; 294/82; 294/85; 248/322
[58] Field of Search ............. 24/115 R, 115 N, 129 R, 24/129 C, 199, 201 HH, 201 HE, 203 R, 225, 228, 230.5 R, 230.5 AD, 230.5 TP, 230.5 W, 265 H, 288, 369, 370, 372; 294/82, 85; 248/320, 322, 328, 329, 330.1, 339, 613

[56] References Cited
U.S. PATENT DOCUMENTS

| 426,778 | 4/1890 | Dalton | 248/322 |
| 441,248 | 11/1890 | Lynch | 248/322 |
| 1,072,285 | 9/1913 | Wigley | 294/82 R |
| 1,331,524 | 2/1920 | Pleister | 24/230.5 R |
| 1,771,314 | 7/1930 | Ramsay | 294/82 R |
| 1,886,138 | 11/1932 | Wells | 24/230.5 FH |
| 2,517,886 | 8/1950 | Koch | 24/370 |
| 2,542,289 | 2/1951 | Robbin | 294/82 R |
| 3,533,890 | 10/1970 | Nesbit | 24/225 |

Primary Examiner—Gene Mancene
Assistant Examiner—David Tarnoff
Attorney, Agent, or Firm—Ernest E. Helms; E. Lawrence Levine

[57] ABSTRACT

A hook is provided for fastening a filter bag thimble to a support member in a filter baghouse. The hook has a first eye for insertion of a tension member and a second eye through which the support member is inserted. The first eye is spaced from the second eye such that the tension member in the first eye is removable when the second eye is held by the support member.

5 Claims, 5 Drawing Figures

U.S. Patent  Sep. 6, 1983  Sheet 1 of 2  4,402,119
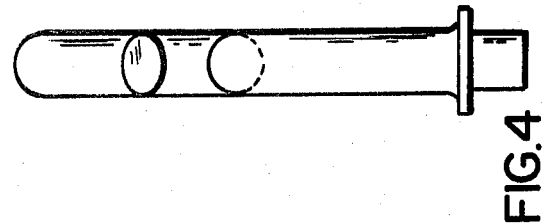
FIG. 4
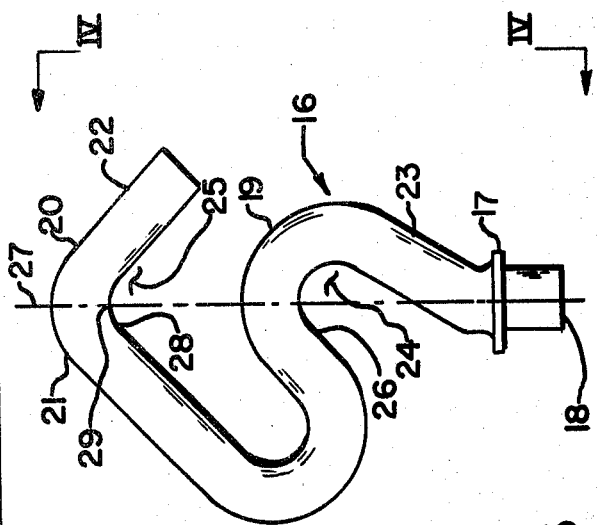
FIG. 3
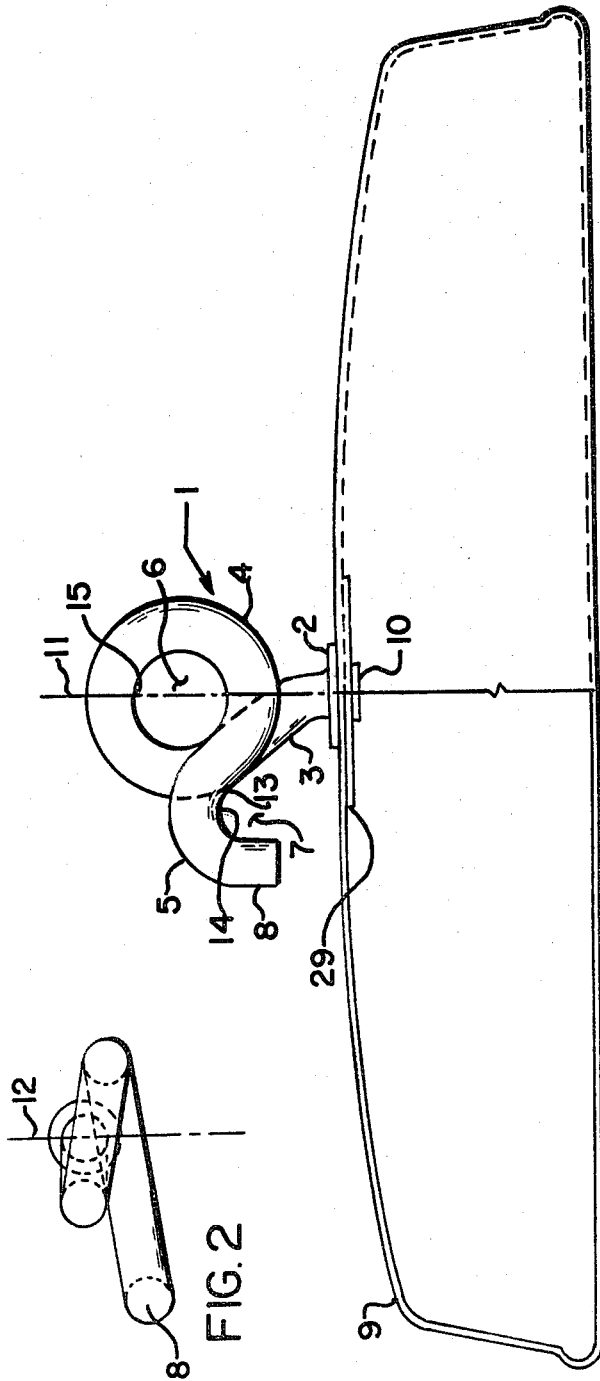
FIG. 2
FIG. 1

FILTER BAG HOOKS

BRIEF SUMMARY OF THE INVENTION

Filter bags are typically assembled in baghouses by hanging a plurality of filter bags from individual support members of a baghouse. In the usual structure one end of the filter bag is provided with a cap to which the filter bag fabric is attached. A hook is typically attached to the cap. The hook has two primary functions. The first function of the hook is to provide means to which a tension member may be connected to pull the filter bag cap and attached filter bag toward the support member. The tension member utilized may be one of several types including but not limited to crane hooks, chains, cables or ropes. The second function of the hook is to fasten the filter bag to a support member of the filter baghouse. The support member may be one of several types, including but not limited to a beam or a bolt hook.

In a conventional method of attaching a filter bag to a support member, a rope or other tension member is disposed through one eye of the hook on the cap of the filter bag. The filter bag is raised by pulling on the rope and is attached to the support member when the hook is raised to an appropriate position to allow the support member to be inserted into the hook. It is apparent to those skilled in the art that the conventional method also covers the situation where the hook is inserted into the support members. The conventional method causes practical problems in that it is difficult to insert the support member into the hook while at the same time retaining tension on the filter bag and holding the bag steady by use of the tension member. In many instances where a bolt hook is utilized as a support member and a rope or cable is utilized as the tension member, manually fastening the filter bag maybe a frustrating, time consuming operation. In particular, one has to avoid the potential hazard of having the rope or cable become trapped by the bolt hook. To effectively deal with the above difficulty two men are usually required to be stationed at a location within reach of the support member to accomplish manual fastening of the hook to the support member while eliminating any possibility of having the tension member becoming trapped inside the hook when the filter bag is hung. Accordingly, an object of the present invention is to provide a new and improved hook which facilitates efficient fastening of a filter bag to a support member. The present invention may be summarized as providing a hook substantially in the shape of an integral curvilinear rod having a first eye and a second eye. The second eye provides means for insertion of a tension member and allows the tension member to impart a force against the hook and move the filter bag or object to which the hook is attached towards the support member. The first eye provides means for insertion of the support member. The first eye is spaced from the second eye such that the tension member in the second eye is removable when the first eye is held by the support member. The present invention is also advantageous in the fact that it reduces the time required to fasten a filter bag to a support member.

Although the subject invention will be described in the embodiment used for fastening filter bag caps in baghouses, it should be understood that the subject invention can be used to attach various objects to support members.

The above and other objects, advantages and features of the invention will become apparent in the following detailed description of the preferred embodiments of the invention taken in connection with the accompanying drawings which are part of the specification.

BRIEF DESCRIPTION OF THE DRAWINGS

FIG. 1 is a front elevation view partially in section of a preferred embodiment of a hook of the present invention attached to a filter bag thimble.

FIG. 2 is a plan view of the hook shown in FIG. 1.

FIG. 3 is a front elevation view of another embodiment of a hook of the present invention.

FIG. 4 is a side elevation view taken along lines IV—IV of the hook shown in FIG. 3.

DETAILED DESCRIPTION

Figure 5:
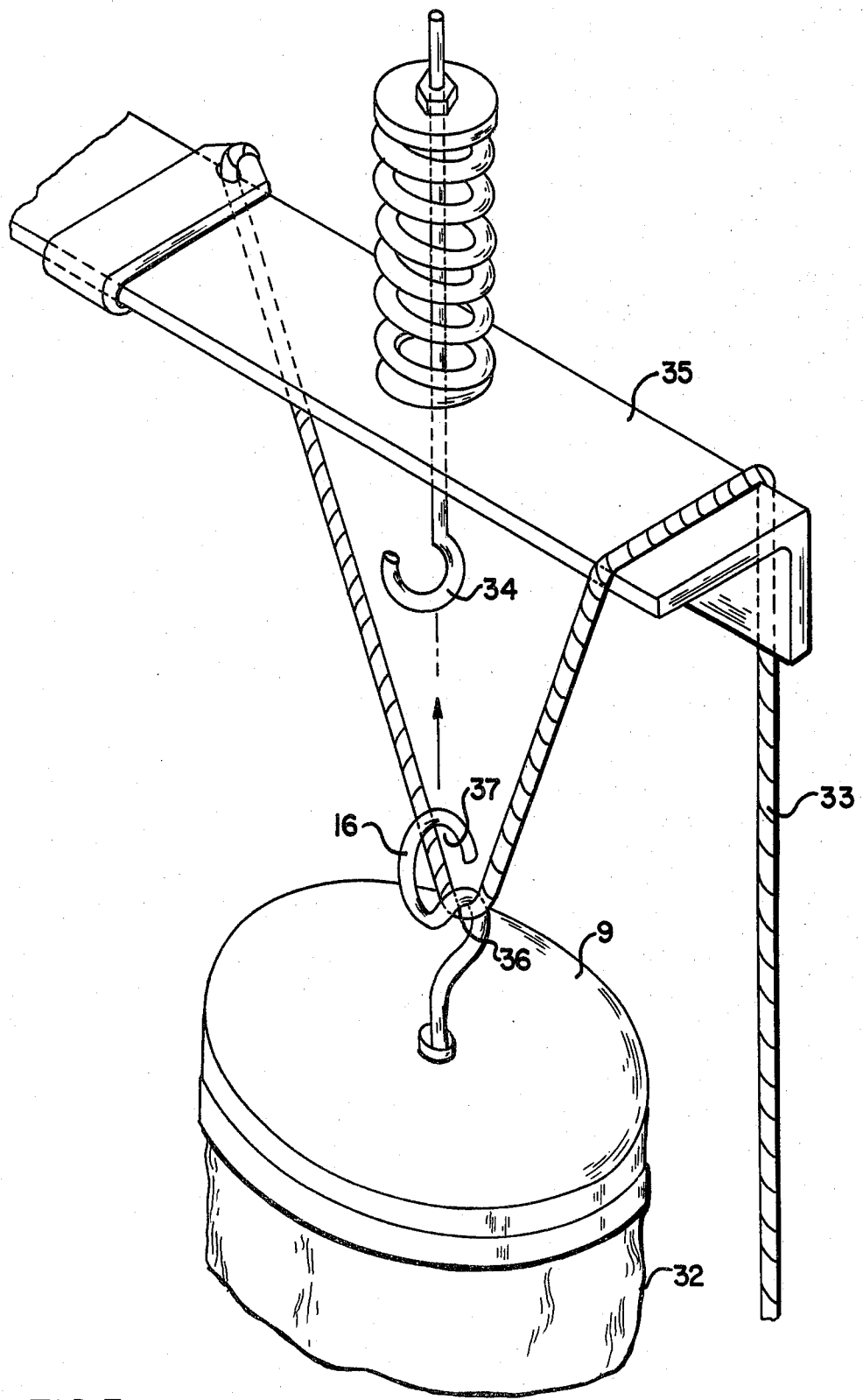
FIG. 5 is a perspective view showing a filter bag being raised by a hook of the subject invention.

In a preferred embodiment shown in FIG. 1 the hook 1 is substantially in the shape of an integral curvilinear rod. Although the embodiment shown in FIG. 1 is formed from a rod, the hook does not have to be formed from a rod but can also be formed from plate material. The hook 1 is formed from a rod 10 which is preferably a one piece axially elongated member subject to curvilinear bending. Although preferred, a rod used to make a hook of the present invention does not have to have a constant outside diameter or be circular. In a preferred embodiment the rod 10 is solid carbon steel having an outside diameter of about ⅜ inch.

At one end of the rod 10 is an anchor 2 which provides means for connecting a filter bag cap 9 to the hook 1. The anchor 2 as shown in FIG. 1 comprises an annular flange toward one end of the rod 10. Typically, a washer 29 is provided under the anchor 2. The end of the rod 10 which is inserted into the filter bag cap 9 is mechanically swaged outwardly, locking the washer 29 between the end of the rod 10 and the anchor 2 and thereby anchoring the hook to the filter bag cap 9. A first straight section 3 is formed where the rod extends from the anchor 2 upwardly and outwardly therefrom at a slope of about 45° forming a generally straight section. The rod 10 is bent into a shape, such that two eyes, a first eye 6 and a second eye 7 are formed. The second eye 6 is formed where the rod 10 extending from the first straight section 3 into a first curvilinear section comprising a generally helical ring portion 4. The first eye 6 is the portion of the hook 1 into which the support member is inserted to fasten the filter bag to the support member. It should be noted that in this embodiment the axial centerline of the helical ring portion 12 is nearly perpendicular to the original axial centerline of the rod 11.

The first eye 7 is formed where a second curvilinear section of the rod 10 extends from the helical ring portion 4 into a generally semicircular bend 5. The inside radius 13 of the semicircular bend 5 is generally facing the anchor 2. The second eye 7 allows a tension member to be inserted therein to impart a force against the hook 1 in a direction generally opposite the anchor 2 for moving the filter bag towards a support member.

The hook 1 shown in FIGS. 1 and 2 has a second straight section 8 toward the terminal end of the rod 10 opposite the anchor 2. As shown in the drawing the second straight section 8 extends from the semicircular bend 5 downward toward the anchor 2 in a generally straight section. As also shown in the preferred embodiment of FIG. 1, the zenith 15 of the first eye 6 as defined by the inside radius of the helical ring portion 4, is above the zenith 14 of the second eye 7, as defined by the inside radius 13 of semicircular bend 5. It is further preferred that the second straight section 8 terminates at a location above the level of the anchor 2. The word "above" as used in the aforementioned sentence, refers to the relative positions between the zenith 14 of the first eye 6 and the second eye 7 when the hook is disposed in a vertical position that is, being vertically above the filter bag cap 9. When the hook 1 is not in a vertical position the word above means a greater distance from the filter bag cap 9. It should be understood by those skilled in the art that the hook of the present invention may be used in any position.

FIGS. 3 and 4 show another embodiment of the subject invention. The hook 16 is substantially in the shape of an integral curvilinear rod which is formed from a rod 18 which is a one piece axially elongated member subjected to curvilinear bending. An anchor 17 is formed by a flange on one end of the rod 18. A first straight section 23 of the hook is formed where the rod 18 extending from the anchor 17 at a slope in a generally straight section. A first eye 24 is formed by the rod 18 extending from the first straight section 23 into a first semicircular bend 19. The inside radius of the first semicircular bend 26 is generally facing toward the anchor 17 and the first semicircular bend 26 extends through the original axial centerline of the rod 27.

A second eye 25 is formed by a second curvilinear section comprising the rod 18 extending upwardly and outwardly from the first semicircular bend 19 through the original axial centerline of the rod 27 into a generally semicircular bend 20. The inside radius 28 of the second semicircular bend 20 is generally facing toward the anchor 17 and the inside radius 28 of the semicircular bend 20 forms a zenith 29 of the hook 16 and is located near the original axial centerline 27 of the rod 18.

A second straight section 22 extends from the second semicircular bend 20 at a generally downward slope in a direction away from the original axial centerline 27 of the rod 18 in a generally straight section terminating at a length generally one to three multiples of the outside radius 21 of the second semicircular bend 20.

In the embodiment shown in FIG. 3 the functions of the first and second eye may be interchanged allowing use of the first eye for insertion of the support member and the second eye as for inserting a tension member.

FIG. 5 is a perspective view showing a filter bag 32 with a hook 16 attached thereto being toward a support member 34 raised with a tension member 33. The filter bag 32 shown in FIG. 5 is capped by a filter bag cap 9. The hook 16, similar to the embodiment shown in FIG. 3 is attached to the filter bag cap 9. The tension member, specifically the rope 33, is engaged in the first eye 36 of hook 16. When the filter bag 32 is raised to an appropriate height by pulling on the rope 33 the bolt hook 34 will be inserted into the second eye 37 of the hook 16 of the present invention. Prior to the subject invention two men typically were required near the beam 35 to complete this operation. One man was required to hold the filter bag steady while the other man inserted the bolt hook 34 into a conventional hook having only one eye. By providing two eyes, the subject invention eliminates the problem of the rope or cable becoming entangled in the hook and the subject invention makes insertion of the bolt hook 34 less difficult. Therefore only one man is now required to be near the beam 35 to attach the filter bag.

Although the invention has been shown in connection with specific embodiments, it will be readily apparent to those skilled in the art that various changes in form and arrangement of parts may be made to suit requirements without departing from the spirit and scope of this invention.

I claim:

1. A hook for fastening a filter bag cap to a support member, said hook being substantially in the shape of an integral curvilinear rod comprising:
   an anchor located at one end of said rod, said anchor providing means for connecting the filter bag cap to said hook;
   a first straight section, said first straight section comprising said rod extending from said anchor at a slope in a generally straight section;
   a first eye formed by a first curvilinear section of said rod into which a support member may be inserted, said first curvilinear section comprising said rod extending from said first straight section into a generally helical ring portion, the helical ring portion axial centerline being nearly perpendicular to an original axial centerline of said rod;
   a second eye, said second eye being formed by a second curvilinear section of said rod through which a tension member may be inserted to impart a force against said hook in a direction generally opposite the imparting of a force upon said hook by said anchor and for moving the filter bag cap toward the support member, said second eye being spaced from said first eye such that the tension member in said second eye is removable when said first eye is held by the support member, said second curvilinear section comprising said rod extending from said helical ring portion into a semicircular bend having an inside radius generally facing toward said anchor; and
   a second straight section, said second straight section comprising said rod extending from said semicircular bend in a generally straight section.

2. An apparatus as described in claim 1 wherein said anchor comprises a flange on said rod.

3. An apparatus as described in claim 1 wherein said first eye has a zenith positioned generally at the portion of said first eye farthest from said anchor and said second eye has a zenith positioned generally at the portion of said second eye farthest from said anchor, said zenith of said first eye being spaced farther from said anchor than said zenith of said second eye.

4. An apparatus as described in claim 1 wherein said hook, including said second straight section, is spaced to one side of said anchor.

5. A hook as described in claims 1, or 2 wherein said hook is formed from a rod which is a one piece axially elongated member subjected to curvilinear bending.

* * * * *